April 27, 1954 C. I. HILL Re. 23,817

AUTOMATIC AIR LIFT CONTROL

Original Filed July 31, 1951

INVENTOR.
CLAUDE I. HILL

BY
Busse and Harding

ATTORNEYS

Reissued Apr. 27, 1954 Re. 23,817

UNITED STATES PATENT OFFICE 23,817

AUTOMATIC AIR LIFT CONTROL

Claude I. Hill, Oak Harbor, Ohio, assignor to Sun Oil Company, Philadelphia, Pa., a corporation of New Jersey Original No. 2,640,731, dated June 2, 1953, Serial No. 239,465, July 31, 1951. Application for reissue February 19, 1954, Serial No. 411,602

7 Claims. (Cl. 302—53)

Matter enclosed in heavy brackets [ ] appears in the original patent but forms no part of this reissue specification; matter printed in italics indicates the additions made by reissue.

This invention relates to a system and apparatus for moving pneumatically granular or pelleted contact material or catalyst from a lower receptacle which receives the material in a continuous stream upwardly into and through an elongate conduit to an upper receptacle. In particular the invention is directed to apparatus for supplying gas or air to the material in the lower receptacle in order to convey it therefrom to and through the elongate conduit in such a manner as to reduce attrition of the material particles or pellets to a minimum during its passage to the upper receptacle.

It is well known in the art of catalysis, such as the cracking of heavier petroleum fractions to gasoline and other hydrocarbon processing operations, to use a catalyst or contact material in a continuous system. In such continuous systems a conversion zone is operated simultaneously with a second zone which is in regeneration. Most commercial moving or continuous catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regenerating zone to the upper conversion zone two well known means applicable to the transportation of granular solids from one locus to another have been used, namely: by mechanical conveyors and by pneumatic conveyors, in the latter of which air, steam or flue gas produced at the refinery is readily available as the pneumatic lifting medium.

It is necessary in systems employing conversion and regeneration zones in superposed relationship to convey the catalyst or contact material through a conduit several hundred feet in length in order to return it from the lower reaction zone to the upper reaction zone. From the lower reaction zone the material is delivered by gravity to a receptacle positioned at a level below that of the lower zone, from which receptacle it is necessary to effect or begin the lifting or upward conveying operation. In a pneumatic lifting system this lowermost receptacle is generally known in the art as an engager since the material is engaged therein by the lifting flue gas or air to effect the lifting operation. The lower end of the air lift conduit extends into or is in communication with the engager receptacle while the upper end of the lift conduit communicates with an upper receptacle positioned at a level above the top of the upper reaction zone or chamber. The upper receptacle is designed so that the lifting medium is separated from the catalyst or contact material and is generally known as the disengager.

The present invention involves an arrangement for engaging material to introduce it to the lower inlet end of the elevating conduit and maintaining it in a continuous stream through the conduit for passage to the disengager in a manner to reduce attrition of the material to a minimum, and in particular is concerned with the flow control of contact material to the elevating conduit.

A complete understanding of the present invention may be had by reference to the following description taken in connection with the accompanying drawings which form a part of the application in which.

Figure 1:
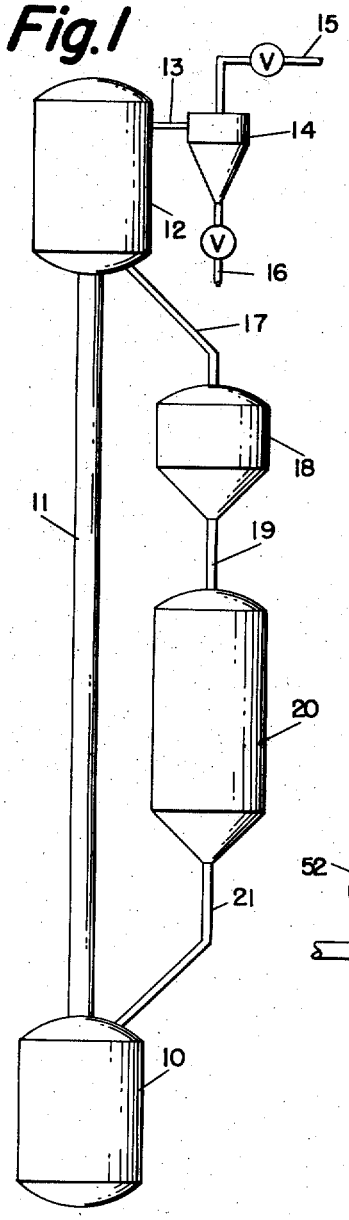
Figure 1 is an elevational view for schematically showing a typical catalytic cracking system employing a pneumatic lift for elevating pelleted catalyst or contact material.

Referring to Figure 1 of the drawing, which shows diagrammatically the conventional elements of a continuous system, a lower receptacle or chamber 10 functions as a catalyst engaging zone, that is, a zone wherein the catalyst is engaged by the air, flue gas or steam supplied thereto by suitable means. The lift pipe or elevating conduit is indicated at 11 and has its lower end communicating with the chamber 10 and its upper end communicating with an upper chamber 12 which is the disengaging chamber or zone wherein the material is disengaged from the air or other elevating medium. The lifting medium is discharged from the upper chamber 12 through a conduit 13 and is passed to any conventional separating means such as a cyclone separator 14 having an upper conduit 15 in communication therewith to remove the lifting medium and a lower conduit 16 for removing any fines which become entrained in the lifting medium.

The catalyst which remains in the disengager 12 is returned through conduit 17 by gravity to an upper reaction chamber 18 wherein usually an on-stream reaction is effected to obtain the desired product and continues to flow therefrom through conduit 19 by gravity into a lower reaction chamber 20 wherein the catalyst or contact material is regenerated to remove any deposits which might have been formed on the catalyst in the upper chamber 18. From the lower chamber 20 the catalyst or contact material continues to flow by gravity through conduit 21 and is returned to the engaging chamber 10. The conduits 17, 19, and 21 through which the catalyst or contact material flows in returning from the disengager 12 to the engager 10 are usually provided with means for supplying steam or other gaseous purging medium thereto in order to prevent reaction products formed in chamber 18 and regeneration fumes formed in chamber 20 from communicating with the other chambers in the unit.

Figure 2:
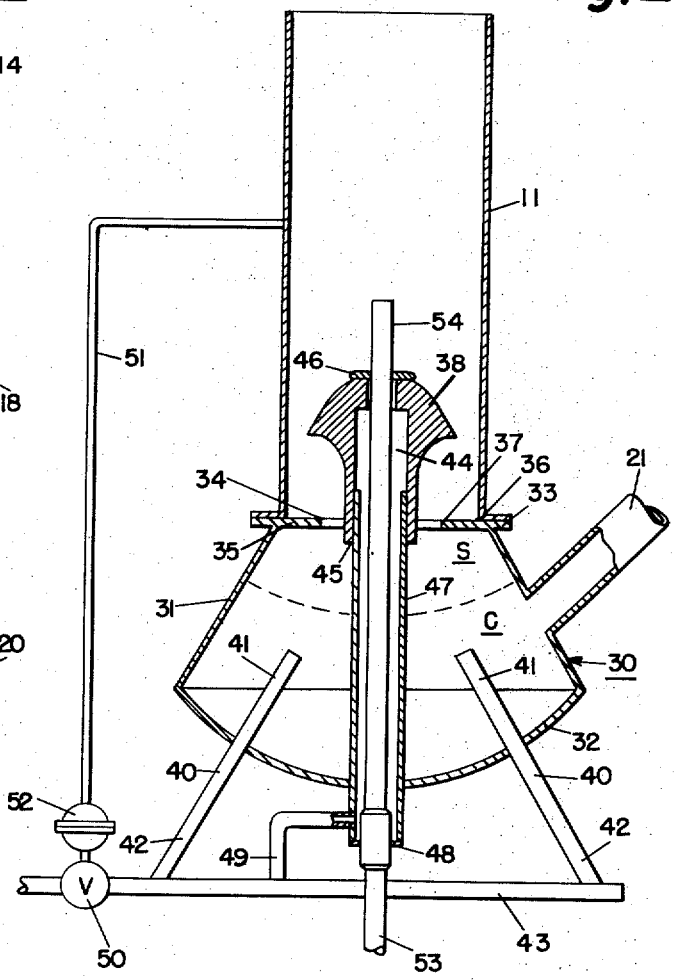
Figure 2 is an enlarged view in sectional elevation showing the invention as applied to the engager portion of the system.

Referring to Figure 2, 30 indicates a preferred design of the lower vessel used in the present system for elevating contact material, and is made up of an inclined wall 31 having an arcuate bottom 32 secured thereto and an upper end plate 33 having an opening 34 therein providing a flange indicated generally at 35. The elevating conduit 11 has its lower inlet end 36 arranged to be received by the flange 35 as indicated and to provide a valve seat 37 for a cooperating valve plug 38 which is, as will be described later, adapted to be moved toward and away from the valve seat 37 to close or open the aperture 34. Contact material C is supplied to the vessel 30 through conduit 21 as in the continuous system described in connection with Figure 1.

The contact material C is moved into the aperture 34 by means of a plurality of conduits 40 which have their inner end portions 41 disposed within the body of contact material and their outer end portions 42 in communication with a fluid manifold 43 which receives fluid from a source and transmits it through the conduits 40 into the body of contact material to move the contact material through the aperture 34 into the inlet end 36 of the conduit 11. The valve plug 38 is formed with a passageway 44 providing an open lower end 45 and a restricted top portion. The passageway 44 of the valve plug receives the upper end of a conduit 47 which has a closed lower end 48 and adjacent its lower end the conduit 47 is provided with a branch conduit 49 which is also in communication with the manifold 43 so that fluid supplied to the manifold is transmitted simultaneously through all of the conduits 40 and branch conduit 49.

During normal operation, the fluid lifting medium usually flue gas from the regeneration zone 20 will be supplied continually to the manifold 43 and the contact material will be moved through the aperture 34 and into the elevating conduit 11 by the fluid from conduits 40. Fluid supplied to the conduit 49 will maintain the valve plug 38 in its upper or open position and the valve plug will remain in its open position until the pressure in elevating conduit 11, due to failure of the contact material to be properly elevated to the upper chamber 12, is increased above a predetermined value, at which time a cut off valve 50 becomes actuated through pressure in line 51 acting on diaphragm 52. This will decrease the fluid supply to manifold 43 and preferably cut off the fluid supply to the manifold. When the fluid supply is cut off the valve plug 38 will fall to the valve seat 37 and prevent further admission of contact material to the conduit 11. The contact material supplied to vessel 30 by conduit 21 will be controlled in order that an upper level approximately that indicated by the dashed lines can be maintained so that the valve 38 can drop into space S and not be impeded by any contact material and also so that any contact material adjacent the valve would have sufficient space to return to the vessel 30.

An independent source of fluid supply through conduit 53 is provided, which will be operated continuously when the valve 38 is open as well as when it is closed and in the event the conduit 11 becomes clogged or blocked by the contact material and the fluid supply to manifold 43 is cut off, the fluid passing through conduit 53 will remove the clogged condition of the material in conduit 11 and when the pressure in the conduit decreases to a point where normal operations can be resumed fluid will again be supplied to manifold 43.

One means of effecting an independent supply of fluid to the elevating conduit 11 is to position the conduit 53, as shown in Figure 2, within the conduit 47 to have its upper end 54 extending through the restricted top portion of the valve plug so that the open end of the conduit is located centrally of and within the elevating conduit and its lower end positioned outwardly of conduit 47 to receive fluid from a source. A stop 46 is positioned about the conduit 53 to limit the upward movement of valve plug 38.

I claim:

1. Apparatus for elevating contact material from a lower vessel containing a body of the material to an upper vessel which comprises an elevating conduit having its lower inlet end in communication with the lower vessel, a plurality of fluid conduits each having an inner end within the lower vessel and an outer end exteriorly of the vessel, a manifold in communication with the outer ends of the conduits to supply fluid thereto for conveying the contact material by fluid pressure from the lower vessel into the elevating conduit, a valve for controlling the passage of contact material into the elevating conduit, said valve including a valve seat adjacent the inlet end of the elevating conduit and a cooperating valve plug movable toward and away from said seat, said valve plug having an axial passageway therethrough, an independent fluid supply conduit extending through the passageway in the valve plug having its inner open end positioned within the elevating conduit and its outer end positioned exteriorly of the lower vessel to receive elevating fluid for passage continuously into the elevating conduit, a sleeve about the independent fluid supply conduit providing a space therewith having a closed lower end and an upper open end, said upper open end extending into the inner end of said passageway in the valve plug, cap means at the upper end of the valve plug and around the upper end portion of the independent fluid supply conduit, providing with the sleeve a sealed space, a conduit in communication with said space and the manifold for supplying fluid to the space and maintain the valve plug in raised position during normal operation, and means between the elevating conduit and the manifold for cutting of the supply of fluid to the manifold when pressure in the elevating conduit attains a predetermined value to cause the valve plug to fall to closed position.

2. Apparatus for elevating contact material from a lower vessel to an upper vessel which comprises an elevating conduit, there being an opening between the lower vessel and the lower end of the conduit for passage of said material from the lower vessel to the conduit, a valve movable into position to substantially seal said opening and thus substantially cut off flow of material from the lower vessel to the conduit and also movable into position to free said opening and allow such flow of material, fluid supply means for admission of pressure fluid to said lower vessel to force the material in said vessel through said opening into said elevating conduit, a fluid supply pipe opening into said elevating conduit and through which pressure fluid may be admitted to the elevating conduit to lift the material admitted thereto, means affording a passage through which fluid pressure may be admitted to said valve to hold it, against the pressure in said elevating conduit, in position to free said opening, a valve controlling the passage of fluid pressure to said passage, a fluid pressure pipe communicating with said elevating conduit, and means, operable by a predetermined rise in pressure in said elevating conduit and the transmission of such pressure through the last named pressure pipe, to close the last named valve to thereupon allow closure of the first named valve by gravity.

3. The apparatus claimed in claim 2 in which said fluid supply means to the lower vessel and said passage to the valve controlling flow of material into the elevating conduit are adapted for connection to the same source of fluid supply and in which the second named valve, when closed as specified, also arrests supply of fluid pressure to said fluid pressure supply means.

4. Apparatus for elevating contact material from a lower vessel containing a body of the material to an upper vessel which comprises an elevating conduit having its upper end in communication with the upper vessel and its lower inlet end in communication with the lower vessel, conduit means for supplying a lifting fluid to the lower vessel for conveying contact material therefrom and into the elevating conduit through its inlet end, a movable valve plug normally closing the inlet end of the elevating conduit, pressure means for maintaining said valve plug in raised position to permit the passage of contact material through the inlet end of the elevating conduit when the lifting fluid is supplied to the lower vessel, and means for cutting off the supply of the lifting fluid to the lower vessel when a predetermined pressure exists in the elevating conduit and simultaneously therewith permitting the valve plug to drop to closed position.

5. Apparatus for elevating contact material from a lower vessel containing a body of the material to an upper vessel which comprises an elevating conduit having its upper end in communication with the upper vessel and its lower inlet end in communication with the lower vessel, lifting fluid conduit means within the lower vessel, means exteriorly of the lower vessel for supplying a lifting fluid to the conduit means for conveying contact material from the lower vessel into the elevating conduit through its inlet end, a movable valve plug for normally closing the inlet end of the elevating conduit, means for supplying pressure to said valve plug for maintaining it in raised position to permit the passage of contact material into the elevating conduit, and means for cutting off the supply of pressure to the valve plug and simultaneously therewith cutting off the supply of lifting fluid to the lower vessel when a predetermined pressure exists in the conduit.

6. Apparatus for elevating contact material to an upper vessel from a lower vessel containing a body of the material which comprises a lift conduit having its upper end in communication with the upper vessel, there being a port between the lower vessel and the lift conduit through which said material may be discharged from the lower vessel to the conduit, a valve movable into a lower position to close said port and into an upper position to open said port, conduit means adapted for connection with a source of fluid pressure, and extending into the lower chamber, through which fluid pressure may be applied to propel said material through said port when the valve is in its open position, another conduit through which fluid pressure may be applied to lift the valve and maintain it in lifted position to maintain said port open, a second valve controlling the flow of pressure fluid through said fluid pressure conduits, means, including a fluid pressure conduit connected with the lift conduit above its lower end, adapted, upon a predetermined rise of pressure in the last named part of the lift conduit to move the second named valve toward its closed position, whereupon the first named valve drops into position to close said port, thus arresting the flow of material into the lift conduit until the pressure therein falls below said predetermined value, and another conduit, connectable with a source of pressure supply and extending into the lift conduit, through which, during the closed position of the first named valve, pressure is applied to lift said material to thereby exert a lifting force upon the material in the lift conduit until the pressure therein drops below that required to operate the second valve as above specified.

7. *Apparatus for elevating contact material from a lower vessel to an upper vessel through a lift conduit which comprises: a first conduit having its upper end positioned within said lower vessel; means for introducing lifting gas into said first conduit to elevate solids from the level of said upper end to a higher level; a second conduit having its upper end at said higher level; means for introducing lifting gas into said second conduit to elevate solids from said higher level through said lift conduit into said upper vessel; control means for varying the rate of flow of lifting gas into said first conduit; and a third conduit communicating with said lift conduit at a level above said higher level and communicating with said control means, whereby said rate may be varied in accordance with pressure changes transmitted from said lift conduit through said third conduit to said control means.*

References Cited in the file of this patent or the original patent

UNITED STATES PATENTS

| Number | Name | Date |
|---|---|---|
| 1,364,532 | Von Porat | Jan. 4, 1921 |
| 1,450,903 | Newhouse | Apr. 3, 1923 |
| 1,791,668 | Fox | Feb. 10, 1931 |
| 2,433,726 | Angell | Dec. 30, 1947 |
| 2,544,011 | Duvall | Mar. 6, 1951 |